US012761405B2

(12) United States Patent
Wu et al.

(10) Patent No.: US 12,761,405 B2
(45) Date of Patent: Oct. 13, 2026

(54) OPTICAL ELEMENT DRIVING MECHANISM

(71) Applicant: Actutek Corporation, Taoyuan City (TW)

(72) Inventors: Chia-Che Wu, Taoyuan City (TW); Chao-Chang Hu, Taoyuan City (TW); Yu-Chiao Lo, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 228 days.

(21) Appl. No.: 18/628,081

(22) Filed: Apr. 5, 2024

(65) Prior Publication Data

US 2024/0337908 A1 Oct. 10, 2024

Related U.S. Application Data

(60) Provisional application No. 63/457,894, filed on Apr. 7, 2023.

(51) Int. Cl.

| | |
|---|---|
| ***G02B 5/00*** | (2006.01) |
| ***G02B 7/02*** | (2021.01) |
| ***G02B 27/64*** | (2006.01) |
| ***G03B 7/26*** | (2021.01) |
| ***G03B 17/12*** | (2021.01) |
| ***G03B 17/56*** | (2021.01) |

(52) U.S. Cl.
CPC ............... *G02B 5/005* (2013.01); *G02B 7/02* (2013.01); *G02B 27/646* (2013.01); *G03B 7/26* (2013.01); *G03B 17/12* (2013.01); *G03B 17/561* (2013.01); *G03B 17/565* (2013.01)

(58) Field of Classification Search
CPC ........ G02B 5/005; G02B 7/02; G02B 27/646; G02B 7/08; G02B 7/09; G03B 7/26; G03B 17/12; G03B 17/561; G03B 17/565; G03B 3/10; G03B 30/00; G03B 5/00; G03B 13/36
USPC .......................................................... 359/813
See application file for complete search history.

(56) References Cited

U.S. PATENT DOCUMENTS

| | | | | |
|---|---|---|---|---|
| 2018/0231793 A1* | 8/2018 | Jeong | ........................ | G03B 5/00 |
| 2019/0230262 A1* | 7/2019 | Wang | ........................ | G03B 5/02 |
| 2021/0278823 A1* | 9/2021 | Sauer | ........................ | G06F 21/10 |
| 2025/0116877 A1* | 4/2025 | Go | ........................ | G02B 7/1821 |

* cited by examiner

*Primary Examiner* — Mohammed A Hasan
(74) *Attorney, Agent, or Firm* — MUNCY, GEISSLER, OLDS & LOWE, P.C.

(57) ABSTRACT

An optical module includes a fixed assembly, a movable assembly, and a first driving assembly. The fixed assembly is configured to be connected to a first optical element. The movable assembly is movable relative to the fixed assembly. The first driving assembly is configured to drive the movable assembly to move relative to the fixed assembly. The fixed assembly includes a first accommodation space which is configured to accommodate a second optical element.

20 Claims, 10 Drawing Sheets

OPTICAL ELEMENT DRIVING MECHANISM

CROSS REFERENCE TO RELATED APPLICATIONS

This application claims the benefit of U.S. Provisional Application No. 63/457,894, filed on Apr. 7, 2023, the entirety of which is incorporated by reference herein.

BACKGROUND OF THE INVENTION

Field of the Disclosure

The present disclosure relates to an optical element driving mechanism, and in particular it relates to an optical element driving mechanism that can carry heavier lenses.

Description of the Related Art

As technology has developed, many of today's electronic devices (such as smartphones) have been equipped with a camera and video functionality. Using the camera modules that are disposed in their electronic devices, users can capture photographs and record videos on those devices.

Today's design of electronic devices continues to follow the trend of miniaturization, meaning that the various components of the camera module and its structure must also be continuously reduced, so as to achieve miniaturization. In general, a driving mechanism in the camera module has a camera lens holder configured to hold a camera lens, and the driving mechanism can have the functions of auto focusing and optical image stabilization. Although the existing driving mechanism can achieve the aforementioned functions of photographing or video recording, however, they still cannot meet all of the users' needs.

Therefore, how to design a camera module capable of performing autofocus and optical anti-shake functions and achieving miniaturization at the same time is a topic nowadays that need to be discussed, and a problem that needs to be solved.

BRIEF SUMMARY OF THE INVENTION

According to some embodiments of the disclosure, an optical element driving mechanism is provided. The optical element driving mechanism includes a fixed assembly, a movable assembly, and a first driving assembly. The fixed assembly is configured to be connected to a first optical element. The movable assembly is movable relative to the fixed assembly. The first driving assembly is configured to drive the movable assembly to move relative to the fixed assembly. The fixed assembly includes a first accommodation space which is configured to accommodate a second optical element.

According to some embodiments, the fixed assembly includes a casing and a base. The casing is configured to be fixedly connected to the base. The casing and the base are arranged along a main axis. The fixed assembly further includes a first fixed part, which is affixed to the casing. The first fixed part is configured to be connected to the first optical element. The movable assembly includes a first movable part which is movably connected to the first fixed part. The first fixed part has a first side surface which faces the first movable part. The first movable part has a first movable surface which faces the first fixed part. The casing has a side wall which faces the first movable part.

According to some embodiments, when viewed along a second axis, the side wall, the first movable surface, the first side surface and the main axis are arranged along a first axis in sequence. The second axis, the first axis and the main axis are perpendicular to each other. When viewed along the main axis, the first movable part surrounds the first fixed part. When viewed along the main axis, the side wall surrounds the first movable part and the first fixed part.

According to some embodiments, the fixed assembly further includes a second fixed part which is affixed to the casing. The second fixed part is disposed on the first fixed part. The second fixed part and the first fixed part are arranged along the main axis. The second fixed part has a third optical element. The second fixed part has a second main body and a plurality of second fixed structures. The plurality of second fixed structures extends from the second main body along the first axis.

According to some embodiments, each of the plurality of second fixed structures has an outward protruding portion and a downward pressing portion. The outward protruding portion is connected between the second main body and the downward pressing portion. When viewed along the first axis, the outward protruding portion overlaps a top wall of the casing. When viewed along the first axis, the downward pressing portion does not overlap the top wall. When viewed along the main axis, the downward pressing portion overlaps the top wall. When viewed along the main axis, the outward protruding portion does not overlap the top wall. When viewed along the main axis, the outward protruding portion has an arc-shaped structure.

According to some embodiments, the first fixed part has a first main body and a first fixed structure. The first fixed structure is configured to be affixed to the casing. The first fixed structure has a plurality of contact portions which protrude from the first main body along the main axis. The plurality of contact portions are configured to be in contact with a bottom surface of a top wall of the casing. The first fixed structure further has a plurality of engaging portions which are respectively disposed on the plurality of contact portions. Each of the plurality of engaging portions has a hook-shaped structure.

According to some embodiments, the plurality of engaging portions are configured to be in contact with a top surface of the top wall. When viewed along the first axis, each of the engaging portions and the corresponding contact portion are located on opposite sides of the top wall. Each of the plurality of contact portions has a left segment and a right segment. When viewed along the main axis, the engaging portion is located between the corresponding left segment and the corresponding right segment.

According to some embodiments, the optical element driving mechanism further includes a middle assembly. The movable assembly is movably connected to the fixed assembly through the middle assembly. The middle assembly includes a first elastic element configured to connect the first movable part and the first fixed part. The first elastic element has a first movable section, a first middle section and a first fixed section. The first middle section is connected between the first movable section and the first fixed section. The first movable section is fixedly connected to an upper surface of the first movable part. The first fixed section is fixedly connected to the first fixed part.

According to some embodiments, the middle assembly includes a second elastic element configured to connect the first movable part and the first fixed part. The second elastic element has a second movable section, a second middle section and a second fixed section. The second middle section is connected between the second movable section and the second fixed section. The second movable section is fixedly connected to a first protruding platform of the first movable part. The first protruding platform protrudes from a lower surface of the first movable part.

According to some embodiments, the second fixed section is fixedly connected to a second protruding platform of the first fixed part. The second protruding platform protrudes from a bottom surface of the first fixed part. When viewed along the first axis, the first elastic element and the second elastic element are not located between the side wall and the first movable surface.

According to some embodiments, the movable assembly further includes a second movable part configured to hold the second optical element. The middle assembly further includes a middle elastic element connected between the first movable section and the second movable part. The middle elastic element has a strip-shaped structure which extends along the main axis. The first driving assembly includes a first magnetic element and a second magnetic element. The first magnetic element is disposed on the first fixed part. The second magnetic element corresponds to the first magnetic element and is disposed on the first movable part. The first magnetic element is configured to induce with the second magnetic element to generate a first driving force. The first driving force is configured to drive the first movable part and the second movable part to move along the main axis relative to the first fixed part. When the first movable part and the second movable part move along the main axis, the middle elastic element moves along the main axis at the same time, and the middle elastic element does not deform.

According to some embodiments, the optical element driving mechanism further includes a second driving assembly configured to drive the second movable part to move relative to the first movable part and the first fixed part. The second driving assembly includes a third magnetic element which is disposed on the second movable part. The third magnetic element is configured to induce with the second magnetic element to generate a second driving force. The second driving force is configured to drive the second movable part to move along the first axis and/or the second axis.

According to some embodiments, the second movable part has a movable main body and at least one cantilever. The at least one cantilever is connected between the movable main body and the casing. The at least one cantilever has a first end portion, a plurality of curved portions, and a second end portion. The curved portions are connected between the first end portion and the second end portion.

According to some embodiments, when viewed along the main axis, the movable main body has a rectangular structure. When viewed along the main axis, the rectangular structure has a side. When viewed along the main axis, the first end portion extends from the center of the side of the rectangular structure. The second end portion is disposed in a communication opening of the casing. The communication opening is formed by the top surface of the casing.

According to some embodiments, the optical element driving mechanism further includes a first circuit assembly which is disposed in an accommodation groove of the casing. The accommodation groove is connected to the communication opening. The fixed assembly further includes a second fixed part, which is affixed to the casing. The second fixed part is disposed on the first fixed part. A second circuit assembly is disposed on the second fixed part, and the second circuit assembly and the second end portion of the second movable part are electrically connected to an external circuit through the first circuit assembly.

According to some embodiments, the accommodation groove has a first accommodation portion and a second accommodation portion. The first accommodation portion is recessed from the top surface of the top wall. The second accommodation portion is recessed from an outside surface of the side wall. The first circuit assembly has a first section and a second section. The second section is connected to the first section. The first section and the second section are respectively accommodated in the first accommodation portion and the second accommodation portion.

According to some embodiments, when viewed along the main axis, the first section has a U-shaped structure surrounding a portion of the second fixed part. The second end portion of the at least one cantilever is fixedly connected to the first section. When viewed along the main axis, the second section has an L-shaped structure.

According to some embodiments, when viewed along the main axis, the accommodation groove does not overlap the first end portion. When viewed along the first axis, the first end portion is located between the side wall and the accommodation groove. When viewed along the second axis, the first end portion does not overlap the accommodation groove. The second circuit assembly has a first electrical connection terminal and a second electrical connection terminal. When viewed along the first axis, the first electrical connection terminal and the second electrical connection terminal are located on opposite sides of the second fixed part.

According to some embodiments, the first electrical connection terminal and the second electrical connection terminal are respectively provided with a plurality of first electrical contacts and a plurality of second electrical contacts, which are connected to the first circuit assembly. When viewed along the first axis, the first section is located in the accommodation groove, and the top surface does not overlap the first section of the first circuit assembly along the second axis. When viewed along the first axis, in the main axis, the first section is closer to a light incident end of the optical element driving mechanism than the second optical element. A plurality of electrical contacts is formed on the second section and is configured to be electrically connected to the external circuit. When viewed along the first axis, in the main axis, the electrical contacts are closer to a light exit end of the optical element driving mechanism than the first section.

According to some embodiments, the first fixed part and the casing are integrally formed as one piece. The optical element driving mechanism further includes a plurality of circuit members embedded in the casing. The movable assembly further includes a second movable part configured to hold the second optical element. The second optical element is electrically connected to the circuit members through at least one cantilever of the second movable part. The circuit members have a plurality of electrical end portions configured to be electrically connected to an external circuit.

The present disclosure provides an optical element driving mechanism, which includes a movable assembly, a fixed assembly and two driving assemblies. The fixed assembly has a first fixed part configured to hold a first optical element. The movable assembly is movably connected to the first fixed part and is configured to hold a second optical element, and the driving assemblies are configured to drive the movable assembly to move relative to the fixed assembly. The fixed assembly includes a casing, and the movable assembly is suspended within the casing and surrounds the first fixed part. Based on such a design, compared with the conventional driving mechanism, the design of the present disclosure can hold a larger weight of the first optical element (the camera lens), and more effectively reduce the weight of the movable part and the driving assemblies, thereby achieving the purpose of reducing the weight.

In some embodiments, the top surface of the casing may be formed with an accommodation groove configured to accommodate a first circuit assembly, and the second movable part of the movable assembly may be electrically connected to an external circuit through the first circuit assembly. The first circuit assembly and the second movable part can be flexible circuit boards. In addition, a second circuit assembly can be disposed on the second fixed part of the fixed assembly, and it can also be electrically connected to the external circuit through the first circuit assembly.

When the first circuit assembly is disposed in the accommodation groove, the first circuit assembly does not exceed the top surface of the casing, so that the purpose of miniaturization can be achieved. In addition, the setting position of the accommodation groove also avoids the first end portion of the cantilever of the second movable part. Therefore, when the second movable part moves, the first end portion does not collide with the bottom surface of the casing, thereby preventing the cantilevers of the second movable part from being damaged.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
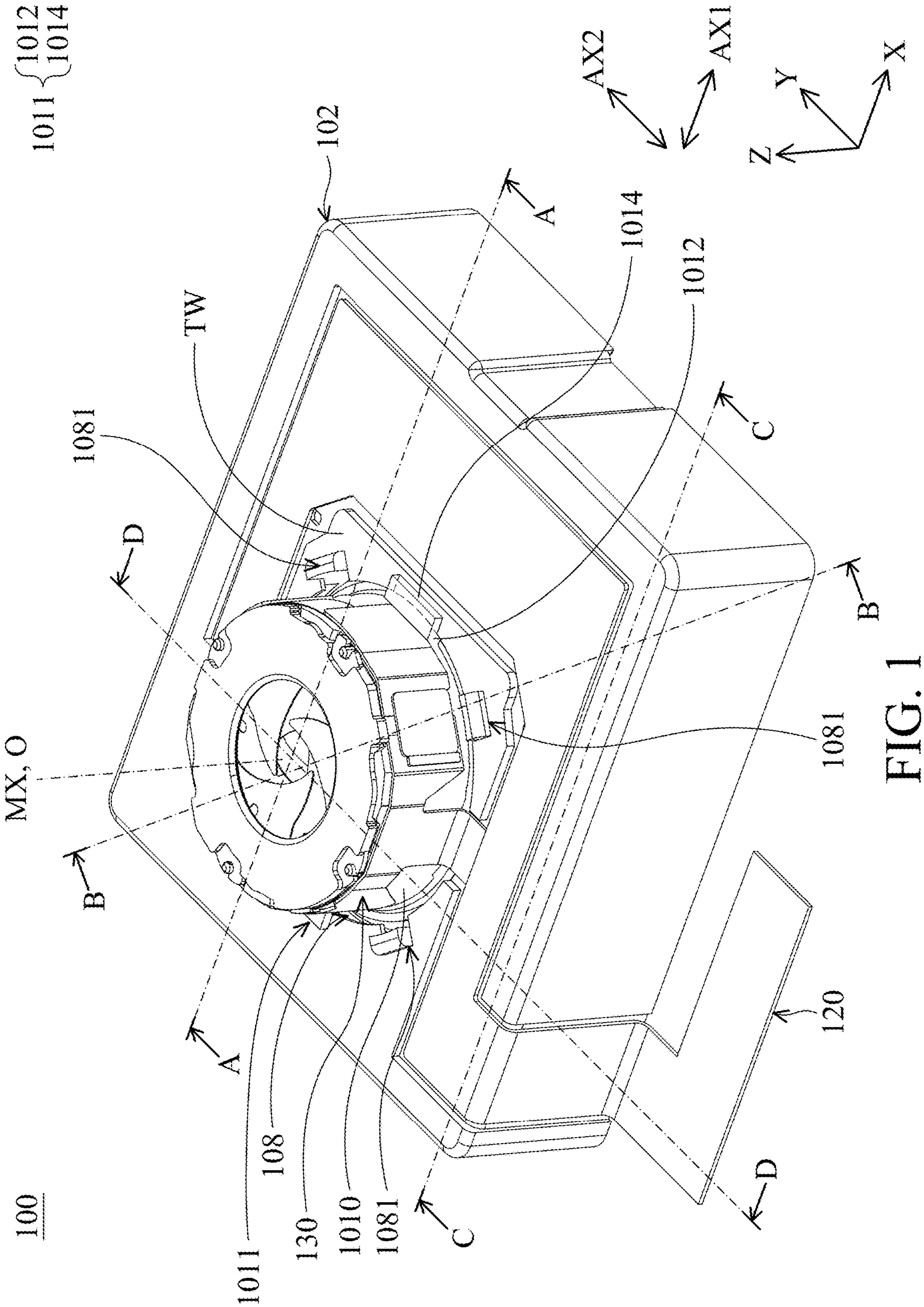
FIG. 1 is a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, “vertical,” “above,” “over,” “below,”, “bottom,” etc. as well as derivatives thereof (e.g., “downwardly,” “upwardly,” etc.) are used in the present disclosure for ease of description of one feature’s relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as “first”, “second”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as “connected” and “interconnected”, refer to a relationship wherein structures are secured or attached to one another either directly or indirectly through intervening structures, as well as both movable or rigid attachments or relationships, unless expressly described otherwise.

Figure 2:
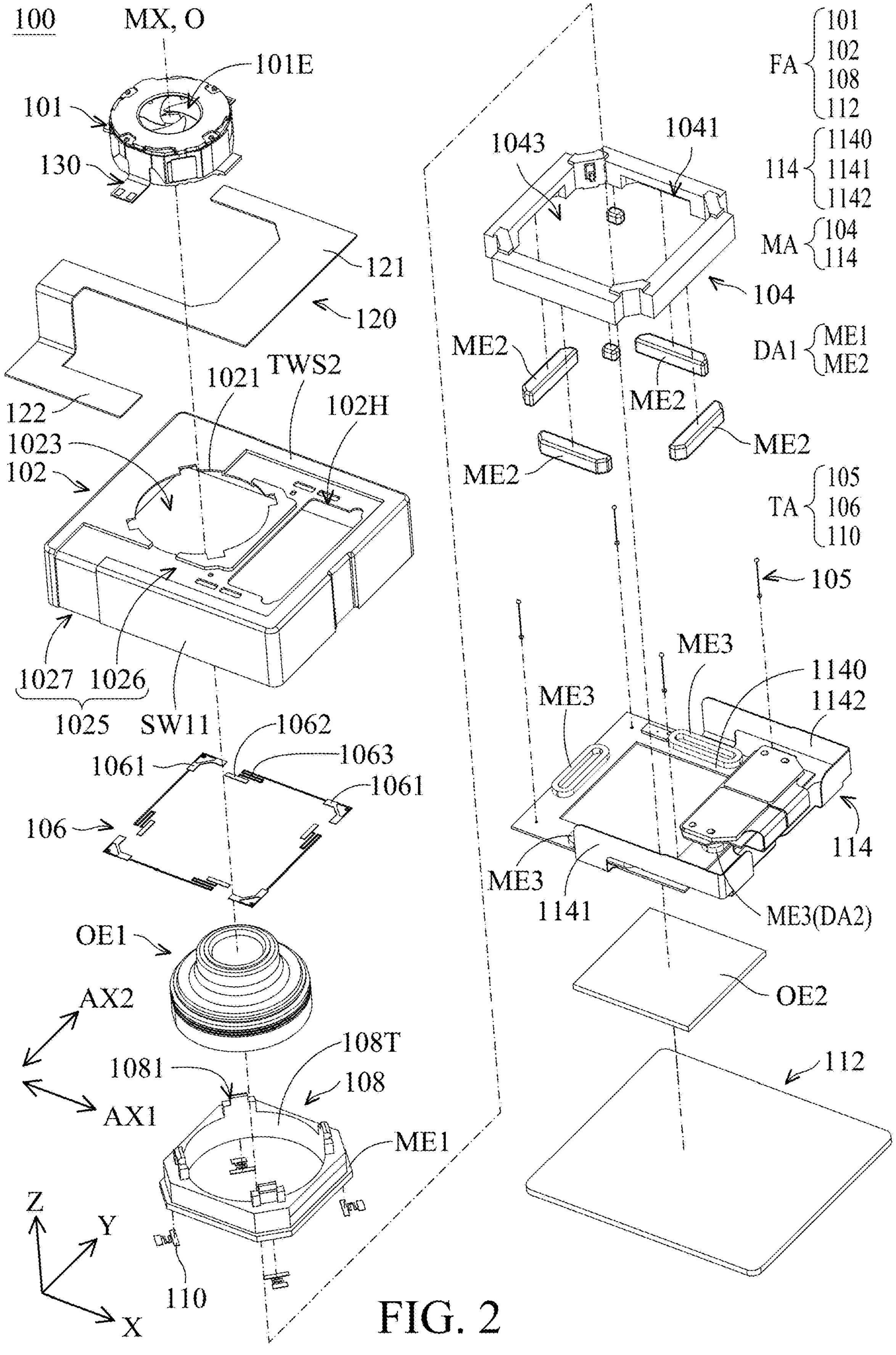
FIG. 2 is an exploded diagram of the optical element driving mechanism 100 according to an embodiment of the present disclosure.
Figure 3:
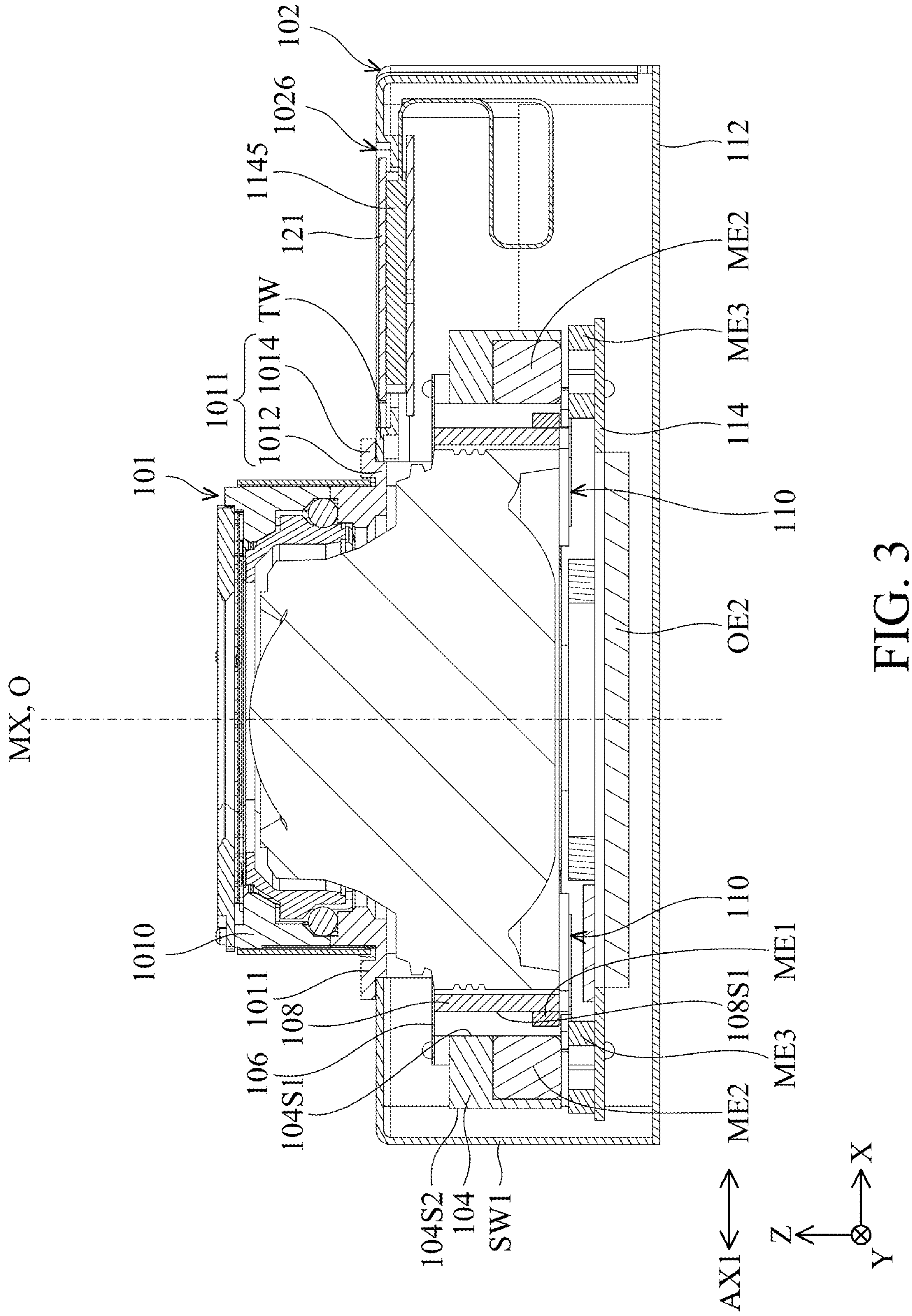
FIG. 3 is a cross-sectional view of the optical element driving mechanism 100 along line A-A in FIG. 1 according to an embodiment of the present disclosure.

Please refer to FIG. 1 to FIG. 3. FIG. 1 is a schematic diagram of an optical element driving mechanism 100 according to an embodiment of the present disclosure, FIG. 2 is an exploded diagram of the optical element driving mechanism 100 according to an embodiment of the present disclosure, and FIG. 3 is a cross-sectional view of the optical element driving mechanism 100 along line A-A in FIG. 1 according to an embodiment of the present disclosure. The optical element driving mechanism 100 can be an optical camera system and can be configured to hold and drive at least one optical element. The optical element driving mechanism 100 can be installed in various electronic devices or portable electronic devices, such as a smartphone, for allowing a user to perform the image capturing function. In this embodiment, the optical element driving mechanism 100 can be a voice coil motor (VCM) with an auto-focusing (AF) function, but it is not limited thereto. In other embodiments, the optical element driving mechanism 100 can also perform the functions of auto-focusing and optical image stabilization (OIS).

In this embodiment, the optical element driving mechanism 100 may include a fixed assembly FA, a movable assembly MA, a first driving assembly DA1 and a second driving assembly DA2. The fixed assembly FA is configured to connect to a first optical element OE1, the movable assembly MA is movably connected to the fixed assembly FA, and the movable assembly MA is movable relative to the fixed assembly FA. The first driving assembly DA1 and the second driving assembly DA2 are configured to drive the movable assembly MA to move relative to the fixed assembly FA.

In this embodiment, as shown in FIG. 2, the fixed assembly FA includes a casing 102 and a base 112. The casing 102 is configured to be fixedly connected to the base 112, and the casing 102 and the base 112 are arranged along a main axis MX. The fixed assembly FA may further include a first fixed part 108 which is affixed to the casing 102, and the first fixed part 108 is configured to be connected to the aforementioned first optical element OE1.

Furthermore, the movable assembly MA may include a first movable part 104 and a second movable part 114. The first movable part 104 is movably connected to the first fixed part 108, and the second movable part 114 is configured to hold a second optical element OE2. The first optical element OE1 is, for example, a camera lens, and the second optical element OE2 is, for example, an image sensor, but they are not limited thereto.

As shown in FIG. 2, the aforementioned casing 102 has a hollow structure, and a casing opening 1021 is formed on it. The center of the casing opening 1021 corresponds to an optical axis O of the first optical element OE1. The casing 102 may further have an accommodation space 1023 (also referred to as the first accommodation space) for accommodating the aforementioned movable assembly MA (including the aforementioned second optical element OE2) and these driving assemblies.

As shown in FIG. 2, the first fixed part 108 has a hollow annular structure and a through hole 108T, and corresponding locking thread structures (not shown) are arranged between the through hole 108T and the first optical element OE1, so that the first optical element OE1 can be locked in the through hole 108T.

Furthermore, the first driving assembly DA1 may include a first magnetic element ME1 (such as a driving coil) and four second magnetic elements ME2. The first magnetic element ME1 can be disposed around the first fixed part 108. These second magnetic elements ME2 correspond to the first magnetic element ME1 and are disposed in the first movable part 104.

Specifically, the first movable part 104 has a plurality of notches 1041 and a central opening 1043. In this embodiment, the first movable part 104 has four notches 1041 to accommodate the four second magnetic elements ME2, but the number of the notches 1041 and the second magnetic element ME2 is not limited to this embodiment. In addition, the first fixed part 108 and the first optical element OE1 are disposed in the central opening 1043.

Furthermore, the second driving assembly DA2 may include four third magnetic elements ME3, which are disposed on the second movable part 114. The second movable part 114 can be a flexible circuit board, and the four third magnetic elements ME3 can be induction coils, which are electrically connected to the second movable part 114. The number of the third magnetic elements ME3 is not limited to this embodiment.

The optical element driving mechanism 100 may further include a middle assembly TA, and the movable assembly MA is movably connected to the fixed assembly FA through the middle assembly TA. The middle assembly TA may include four first elastic elements 106 configured to connect the first movable part 104 and the first fixed part 108. Similarly, the middle assembly TA may further include four second elastic elements 110 configured to connect the first movable part 104 and the first fixed part 108.

The first elastic elements 106 and the second elastic elements 110 are, for example, elastic spring sheets, but they are not limited thereto. Based on the configuration of the middle assembly TA, the first movable part 104 can be connected to the first fixed part 108 through the first elastic elements 106 and the second elastic elements 110 to be suspended in the accommodation space 1023 and surround the first fixed part 108. As shown in FIG. 1 and FIG. 2, the first fixed part 108 has four first fixed structures 1081 which are affixed to the casing 102. The structural features of these first fixed structures 1081 will be described in detail in the following paragraphs.

Furthermore, the middle assembly TA may further include four middle elastic elements 105, which are connected between the four first elastic elements 106 and the second movable part 114. Each middle elastic element 105 has a long strip-shaped structure, such as a columnar or linear structure, which extends along the main axis MX, but it is not limited thereto.

Therefore, when the first magnetic element ME1 is provided with electricity, the four second magnetic elements ME2 induce with the first magnetic element ME1 to generate an electromagnetic driving force (the first driving force), so that the first movable part 104 and the second movable part 114 with the second optical element OE2 are driven to move along the main axis MX relative to the first fixed part 108, and the middle elastic elements 105 also move along the main axis MX relative to the first fixed part 108 at the same time, so as to perform the auto focusing function.

One end of each middle elastic element 105 is connected to a first movable section 1061 of the corresponding first elastic element 106, and the other end of the middle elastic element 105 is connected to the second movable part 114 and is electrically connected to the second movable part 114. Based on the aforementioned structural configuration, the second movable part 114 and the second optical element OE2 can move relative to the first fixed part 108 and the first movable part 104 through the four flexible middle elastic elements 105 in a direction parallel to the X-Y plane.

That is, the second driving assembly DA2 is configured to drive the second movable part 114 to move relative to the first movable part 104 and the first fixed part 108. Specifically, these third magnetic elements ME3 can be induction coils, and when the third magnetic elements ME3 are energized and induce with the corresponding second magnetic elements ME2, another electromagnetic driving force (the second driving force) is generated to drive the second movable part 114 and the second optical element OE2 to move along a first axis AX1 and/or a second axis AX2. Therefore, when the optical element driving mechanism 100 is shaken, the second optical element OE2 can be driven by the electromagnetic driving force to move along the X-Y plane to achieve the purpose of optical image stabilization.

It is worth mentioning that when the second movable part 114 moves along the first axis AX1 and/or a second axis AX2, the middle elastic elements 105 may deform, but when the first movable part 104, the second movable part 114 and the middle elastic element 105 move along the main axis MX together, the middle elastic elements 105 do not deform.

Furthermore, as shown in FIG. 2, the fixed assembly FA may further include a second fixed part 101 which is affixed to the casing 102, and the second fixed part 101 is disposed on the first fixed part 108. The second fixed part 101 and the first fixed part 108 may be arranged along the main axis MX, and the second fixed part 101 may have a third optical element 101E (such as an aperture structure).

The external light can move along the optical axis O and pass through the aperture structure of the second fixed part 101 and the first optical element OE1 and then to be received by the second optical element OE2. In this embodiment, the second optical element OE is the aforementioned image sensor, configured to receive the aforementioned external light to generate a digital image signal.

Furthermore, as shown in FIG. 3, the first fixed part 108 has a first side surface 108S1 which faces the first movable part 104, and the first movable part 104 has a first movable surface 104S1 which faces the first fixed part 108. In addition, the casing 102 has a side wall SW1 which faces the first movable part 104.

As shown in FIG. 3, when viewed along the second axis AX2 (the Y-axis), the side wall SW1, the first movable surface 104S1, the first side surface 108S1 and the main axis MX are arranged along the first axis AX1 in sequence. The second axis AX2, the first axis AX1 and the main axis MX are perpendicular to each other.

When viewed along the main axis MX or the first axis AX1, the first movable part 104 surrounds first fixed part 108. When viewed along the main axis MX or the first axis AX1, the side wall SW1 surrounds the first movable part 104 and the first fixed part 108.

That is, when taking the main axis MX as the center, the fixed parts (such as the first fixed part 108) of the optical element driving mechanism 100 is located in the center, and the movable parts (such as the first movable part 104) is arranged outward from the center. In addition, along the first axis AX1, there is no element between the first movable part 104 and the side wall SW1 that drives or guides the movement of the first movable part 104 and the second movable part 114. For example, when viewed along the first axis AX1 or the second axis AX2, the first elastic element 106 and the second elastic element 110 are not located between the side wall SW1 and a second movable surface 104S2 of the first movable part 104.

Figure 4:
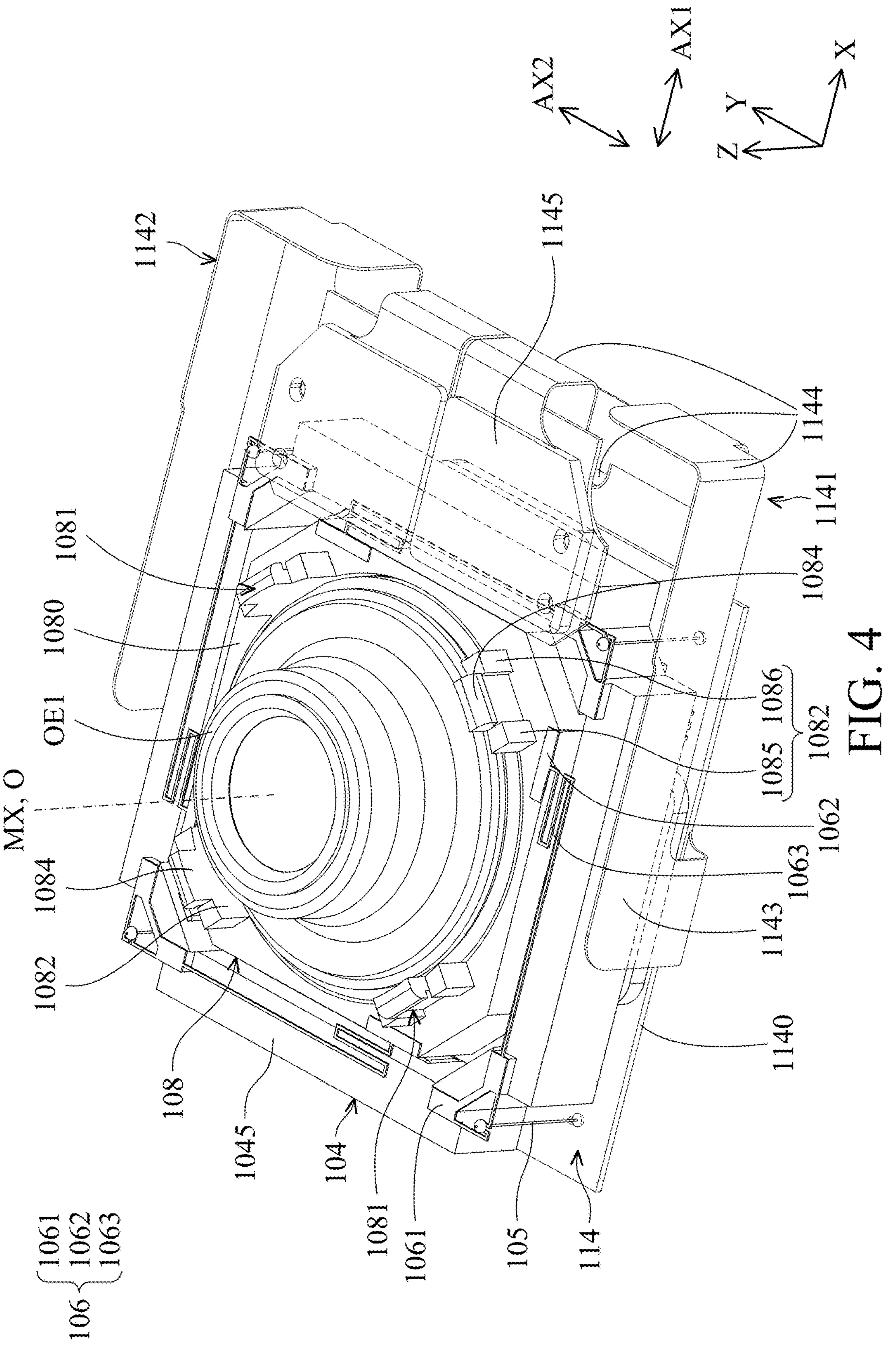
FIG. 4 is a perspective view of a partial structure of the optical element driving mechanism 100 according to an embodiment of the present disclosure.
Figure 5:
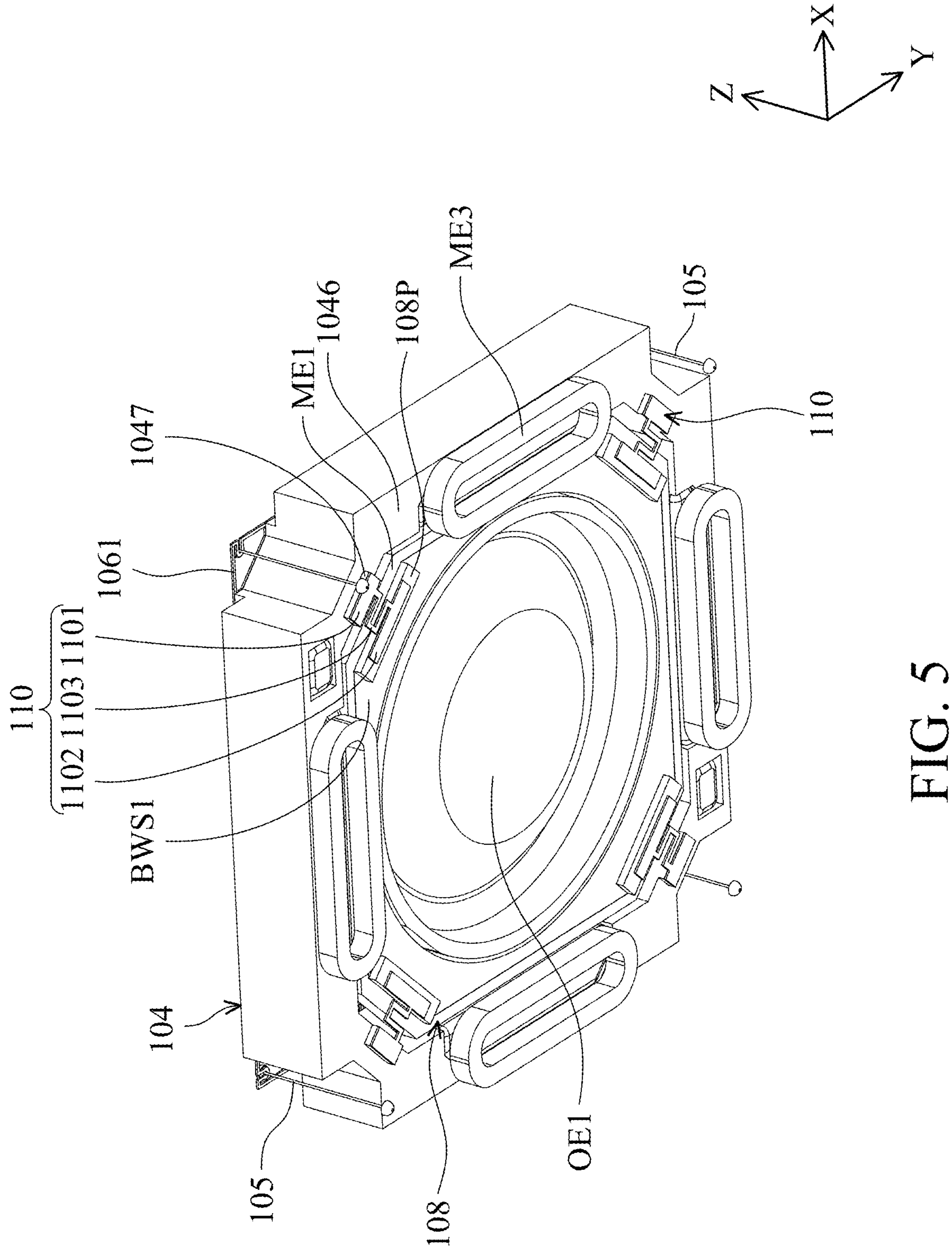
FIG. 5 is a perspective view of a partial structure of the optical element driving mechanism 100 in another view according to an embodiment of the present disclosure.

Next, please refer to FIG. 4 to FIG. 5. FIG. 4 is a perspective view of a partial structure of the optical element driving mechanism 100 according to an embodiment of the present disclosure, and FIG. 5 is a perspective view of a partial structure of the optical element driving mechanism 100 in another view according to an embodiment of the present disclosure. In this embodiment, the first elastic element 106 has a first movable section 1061, a first middle section 1063 and a first fixed section 1062.

As shown in FIG. 4, the first middle section 1063 is connected between the first movable section 1061 and the first fixed section 1062. The first movable section 1061 is fixedly connected to an upper surface 1045 of the first movable part 104, and the first fixed section 1062 is fixedly connected to the first fixed part 108.

Correspondingly, as shown in FIG. 5, each of the second elastic elements 110 has a second movable section 1101, a second middle section 1103 and a second fixed section 1102, and the second middle section 1103 is connected between the second movable section 1101 and the second fixed section 1102.

Specifically, the second movable section 1101 is fixedly connected to a first protruding platform 1047 of the first movable part 104, and the first protruding platform 1047 protrudes from the lower surface 1046 of the first movable part 104.

Similarly, the second fixed section 1102 is fixedly connected to a second protruding platform 108P of the first fixed part 108, and the second protruding platform 108P protrudes from the bottom surface BWS1 of the first fixed part 108. Based on such a configuration, when the first movable part 104 moves along the main axis MX, the problem of the second elastic element 110 colliding with the first magnetic element ME1 can be avoided.

Figure 6:
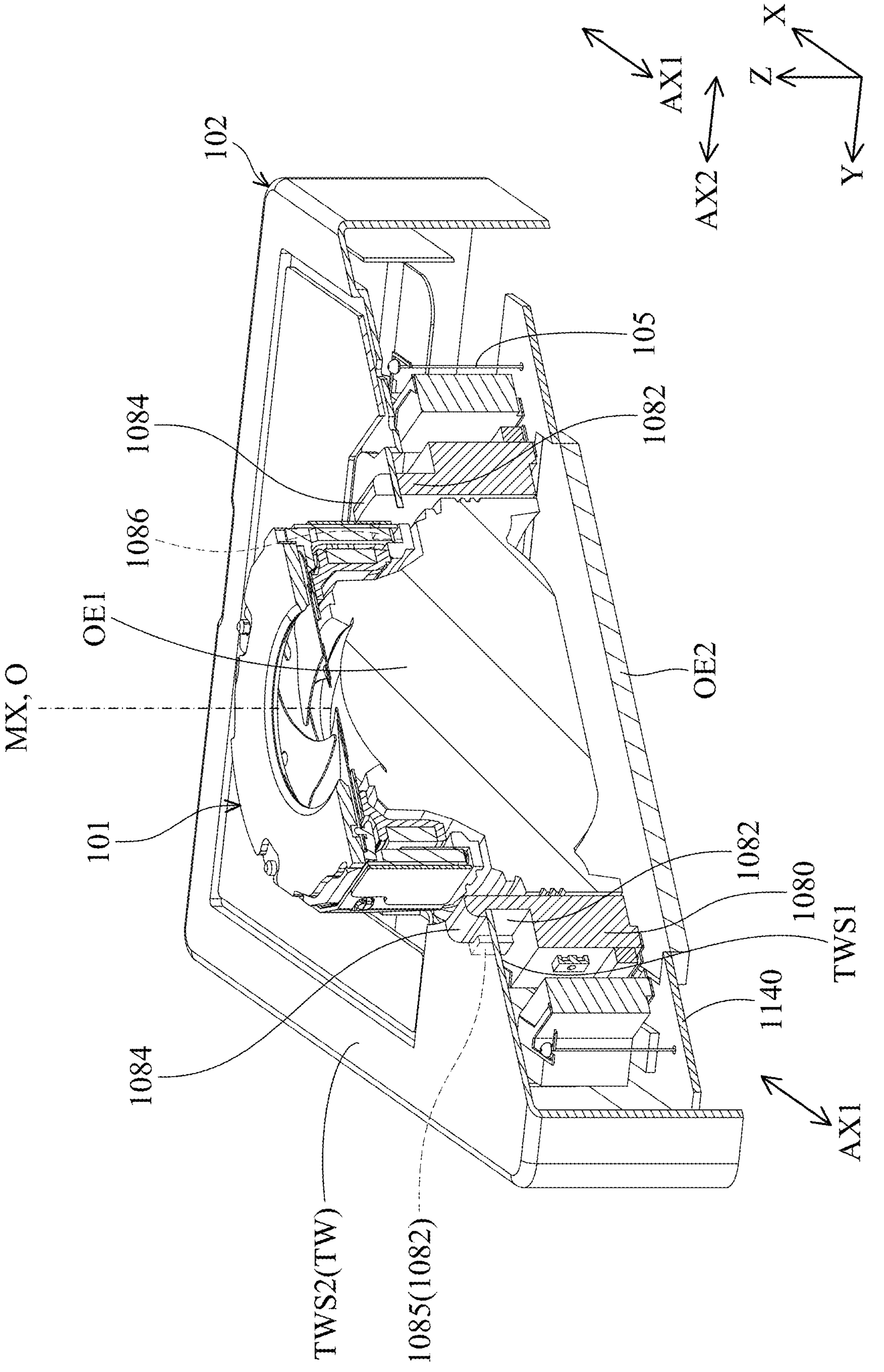
FIG. 6 is a three-dimensional cross-sectional view of the optical element driving mechanism 100 along the line B-B in FIG. 1 according to an embodiment of the present disclosure.

Next, please refer to FIG. 4 and FIG. 6. FIG. 6 is a three-dimensional cross-sectional view of the optical element driving mechanism 100 along the line B-B in FIG. 1 according to an embodiment of the present disclosure. In this embodiment, the first fixed part 108 may have a first main body 1080 and the four first fixed structures 1081. These first fixed structures 1081 are configured to be affixed to the casing 102. Specifically, each first fixed structure 1081 has a contact portion 1082 which protrudes from the first main body 1080 toward the casing 102 along the main axis MX.

Each contact portion 1082 is configured to be in contact with a bottom surface TWS1 of the top wall TW of the casing 102. As shown in FIG. 6, when viewed along the main axis MX, the two opposing contact portions 1082 are symmetrically arranged on both sides of the first optical element OE1.

Furthermore, each first fixed structure 1081 further has an engaging portion 1084 which is disposed on the contact portion 1082, and the engaging portion 1084 has a hook-shaped structure. The engaging portion 1084 is configured to contact a top surface TWS2 of the top wall TW.

As shown in FIG. 6, when viewed along the first axis AX1, each engaging portion 1084 and the corresponding contact portion 1082 are located on opposite sides of the top wall TW. Furthermore, as shown in FIG. 4, each contact portion 1082 may have a left segment 1085 and a right segment 1086, and when viewed along the main axis MX, the engaging portion 1084 is located between the left segment 1085 and the right segment 1086.

Based on such a structural configuration, the first fixed part 108 can be reliably engaged and affixed to the casing

102 so as to carry the first optical element OE1 with a large weight, and the weight of these fixed parts do not affect the movement of the movable assembly MA. In addition, the number of first fixed structures 1081 is not limited to this embodiment. For example, only two first fixed structures 1081 may be adopted in some embodiments.

Then please return to FIG. 1 and FIG. 3. In this embodiment, the second fixed part 101 has a second main body 1010 and two second fixed structures 1011, and the two second fixed structures 1011 extend from the second main body 1010 along the first axis AX1.

Each of the two second fixed structures 1011 has an outward protruding portion 1012 and a downward pressing portion 1014, and the outward protruding portion 1012 is connected between the second main body 1010 and the downward pressing portion 1014.

As shown in FIG. 1 and FIG. 3, when viewed along the first axis AX1, the outward protruding portion 1012 overlaps the top wall TW of the casing 102, and when viewed along the first axis AX1, the downward pressing portion 1014 does not overlap the top wall TW.

As shown in FIG. 3, when viewed along the main axis MX, the downward pressing portion 1014 overlaps the top wall TW, and when viewed along the main axis MX, the outward protruding portion 1012 does not overlap the top wall TW. Furthermore, as shown in FIG. 1, the outward protruding portion 1012 may have an arc-shaped structure when viewed along the main axis MX.

Figure 7:
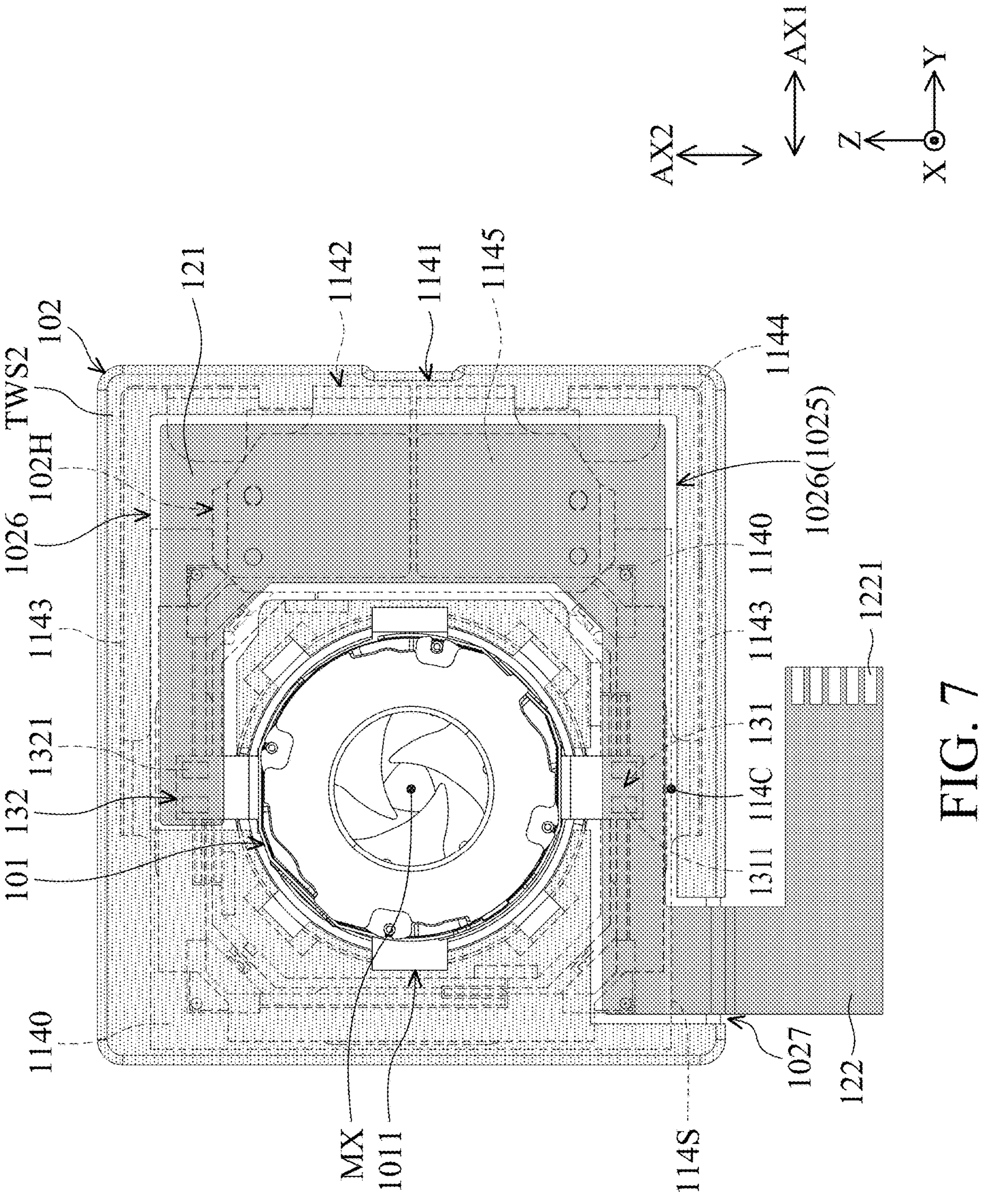
FIG. 7 is a top view of the optical element driving mechanism 100 according to an embodiment of the present disclosure.

Next, please refer to FIG. 4 and FIG. 7. FIG. 7 is a top view of the optical element driving mechanism 100 according to an embodiment of the present disclosure. In this embodiment, the second movable part 114 has a movable main body 1140 and two cantilevers 1141 and 1142, and the cantilevers 1141 and 1142 are connected between the movable main body 1140 and the casing 102.

Because the cantilever 1141 and 1142 are symmetrical, only the detailed structural characteristics of cantilever 1141 are introduced in the following paragraphs. The cantilever 1141 may have a first end portion 1143, a plurality of curved portions 1144 and a second end portion 1145, and these curved portions 1144 are connected between the first end portion 1143 and the second end portion 1145.

As shown in FIG. 7, when viewed along the main axis MX, the movable main body 1140 has a rectangular structure. When viewed along main axis MX, the rectangular structure has a side 114S, and the first end portion 1143 extends from a center 114C of the side 114S of the rectangular structure. The first end portion 1143 and the movable main body 1140 are connected to each other. Based on the such configuration that the first end portion 1143 is connected to the center 114C of the side 114S, the movable main body 1140 can move along the first axis AX1 and/or the second axis AX2 more stable without tilting. Moreover, as shown in FIG. 2, the second end portion 1145 is disposed in a communication opening 102H of the casing 102. The communication opening 102H is formed by the top surface TWS2 of the casing 102.

Furthermore, as shown in FIG. 2 and FIG. 7, the optical element driving mechanism 100 further includes a first circuit assembly 120 which is disposed in an accommodation groove 1025 of the casing 102, and the accommodation groove 1025 is connected to the communication opening 102H.

In addition, in this embodiment, a second circuit assembly 130 can be disposed on the second fixed part 101, and the second circuit assembly 130 and the second end portions 1145 of the second movable part 114 are electrically connected to an external circuit through the first circuit assembly 120.

The first circuit assembly 120 and the second circuit assembly 130 are flexible circuit boards, and the external circuit is, for example, a control integrated circuit or a control chip of the electronic device, but it is not limited thereto.

Based on the above electrical connection configuration, the external circuit can send a control signal through the lines in the first circuit assembly 120 and the second circuit assembly 130 to control the aperture structure of the second fixed part 101 to perform the operation of open and close.

As shown in FIG. 2, the accommodation groove 1025 may have a first accommodation portion 1026 and a second accommodation portion 1027. The first accommodation portion 1026 is recessed from the top surface TWS2 of the top wall TW, and the second accommodation portion 1027 is recessed from the outside surface SW11 of the side wall SW1.

Correspondingly, the first circuit assembly 120 may have a first section 121 and a second section 122. The second section 122 is connected to the first section 121, and the first section 121 and the second section 122 are respectively accommodated in the first accommodation portion 1026 and the second accommodation portion 1027.

As shown in FIG. 7, when viewed along the main axis MX, the first section 121 may have a U-shaped structure surrounding a portion of the second fixed part 101. Furthermore, when viewed along the main axis MX, the second section 122 has an L-shaped structure.

Figure 8:
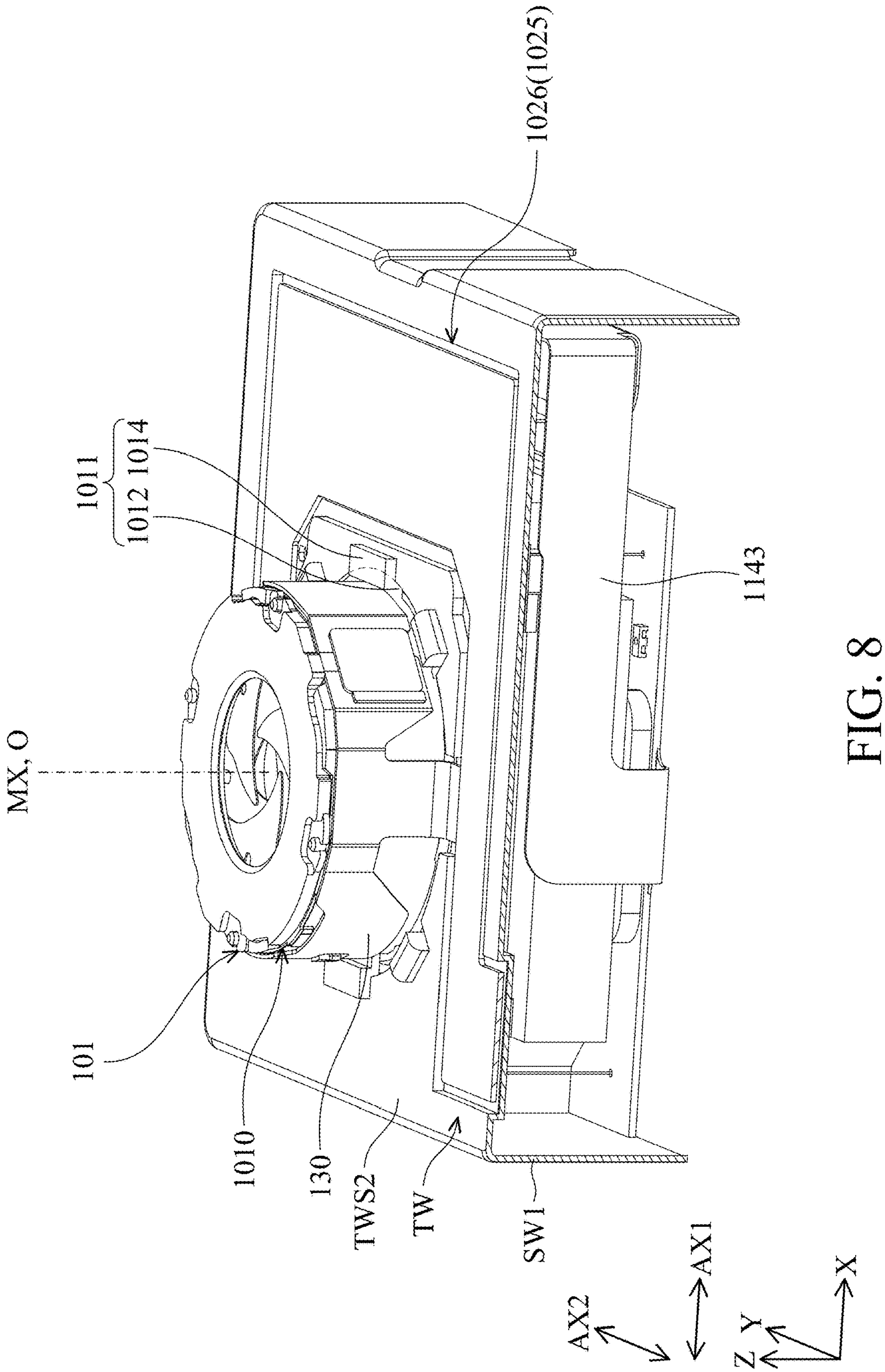
FIG. 8 is a three-dimensional cross-sectional view of the optical element driving mechanism 100 along line C-C in FIG. 1 according to an embodiment of the present disclosure.
Figure 9:
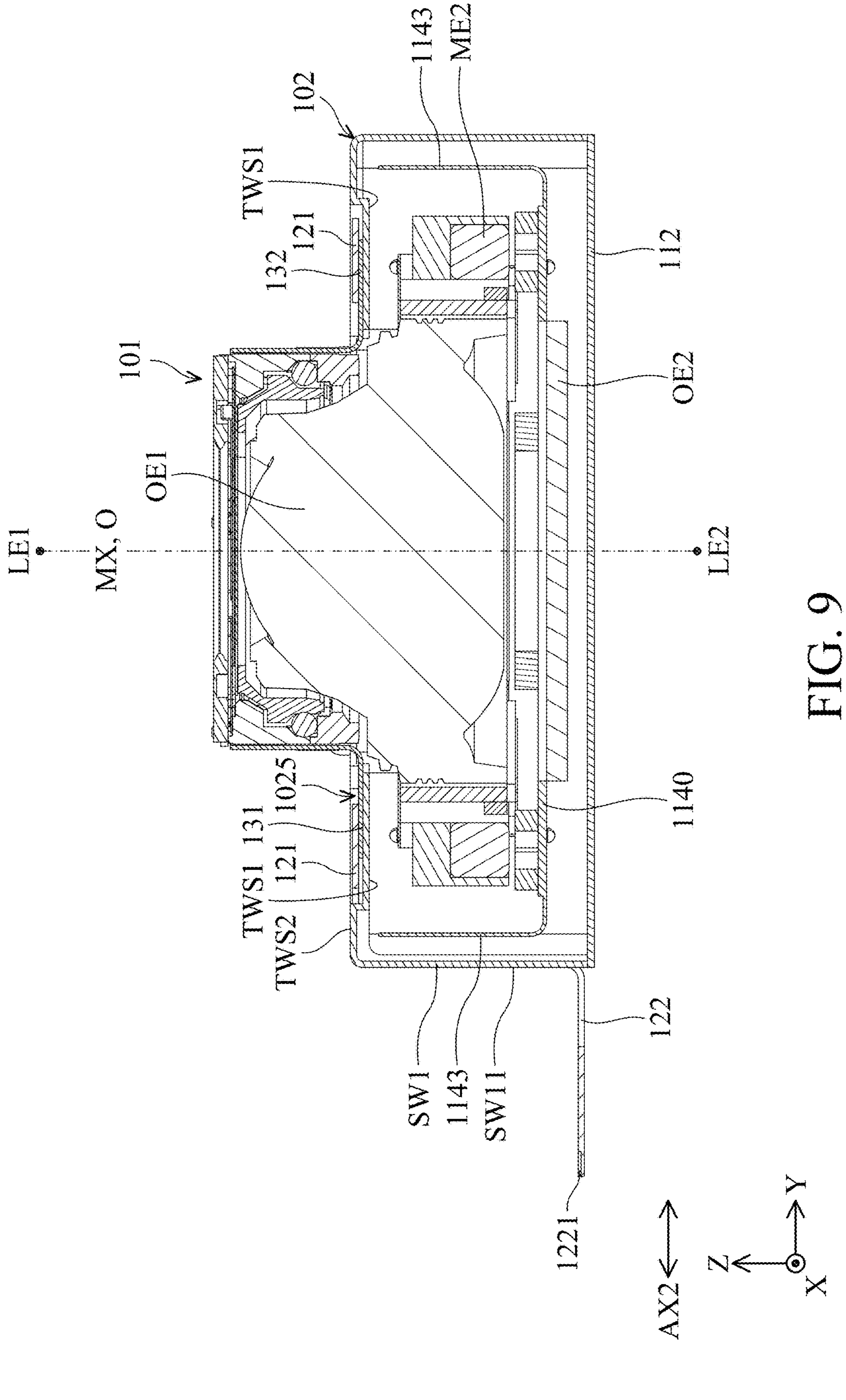
FIG. 9 is a cross-sectional view of the optical element driving mechanism 100 along line D-D in FIG. 1 according to an embodiment of the present disclosure.

Next, please refer to FIG. 7 to FIG. 9. FIG. 8 is a three-dimensional cross-sectional view of the optical element driving mechanism 100 along line C-C in FIG. 1 according to an embodiment of the present disclosure, and FIG. 9 is a cross-sectional view of the optical element driving mechanism 100 along line D-D in FIG. 1 according to an embodiment of the present disclosure.

As shown in FIG. 7 and FIG. 8, when viewed along the main axis MX, the accommodation groove 1025 does not overlap the first end portion 1143. Furthermore, as shown in FIG. 9, when viewed along the first axis AX1, the first end portion 1143 is located between the side wall SW1 and the accommodation groove 1025. In addition, as shown in FIG. 8 and FIG. 9, when viewed along the second axis AX2, the first end portion 1143 does not overlap the accommodation groove 1025, and the first end portion 1143 does not overlap the bottom surface TWS1 below the accommodation groove 1025.

Furthermore, as shown in FIG. 7 and FIG. 9, the second circuit assembly 130 has a first electrical connection terminal 131 and a second electrical connection terminal 132, and when viewed along the first axis AX1, the first electrical connection terminal 131 and the second electrical connection terminal 132 are located on opposite sides of the second fixed part 101, but they are not limited thereto in other embodiments. The first electrical connection terminal 131 and the second electrical connection terminal 132 are connected to the first section 121. Specifically, the first electrical connection terminal 131 and the second electrical connection terminal 132 can be respectively provided with two first electrical contacts 1311 and two second electrical contacts 1321, which can be connected to the first circuit assembly 120 through welding, but the connection manner is not limited thereto.

As shown in FIG. 9, when viewed along the first axis AX1, the first section 121 is located in the accommodation groove 1025, and the top surface TWS2 does not overlap the first section 121 of the first circuit assembly 120 along the second axis AX2. That is, according to the above structural configuration, the optical element driving mechanism 100 can be more miniaturized, and when the movable main body 1140 of the second movable part 114 moves, the cantilever 1141 moving with the movable main body 1140 will not collide with the top wall TW to be damaged.

In addition, as shown in FIG. 9, when viewed along the first axis AX1, the first section 121 is closer to a light incident end LE1 of the optical element driving mechanism 100 than the second optical element OE2 along the Z-axis.

Furthermore, as shown in FIG. 7, a plurality of electrical contacts 1221 can be formed on the second section 122 and are configured to be electrically connected to the aforementioned external circuit. As shown in FIG. 9, when viewed along the first axis AX1, these electrical contacts 1221 are closer to a light exit end LE2 of the optical element driving mechanism 100 than the first section 121 along the Z-axis.

Figure 10:
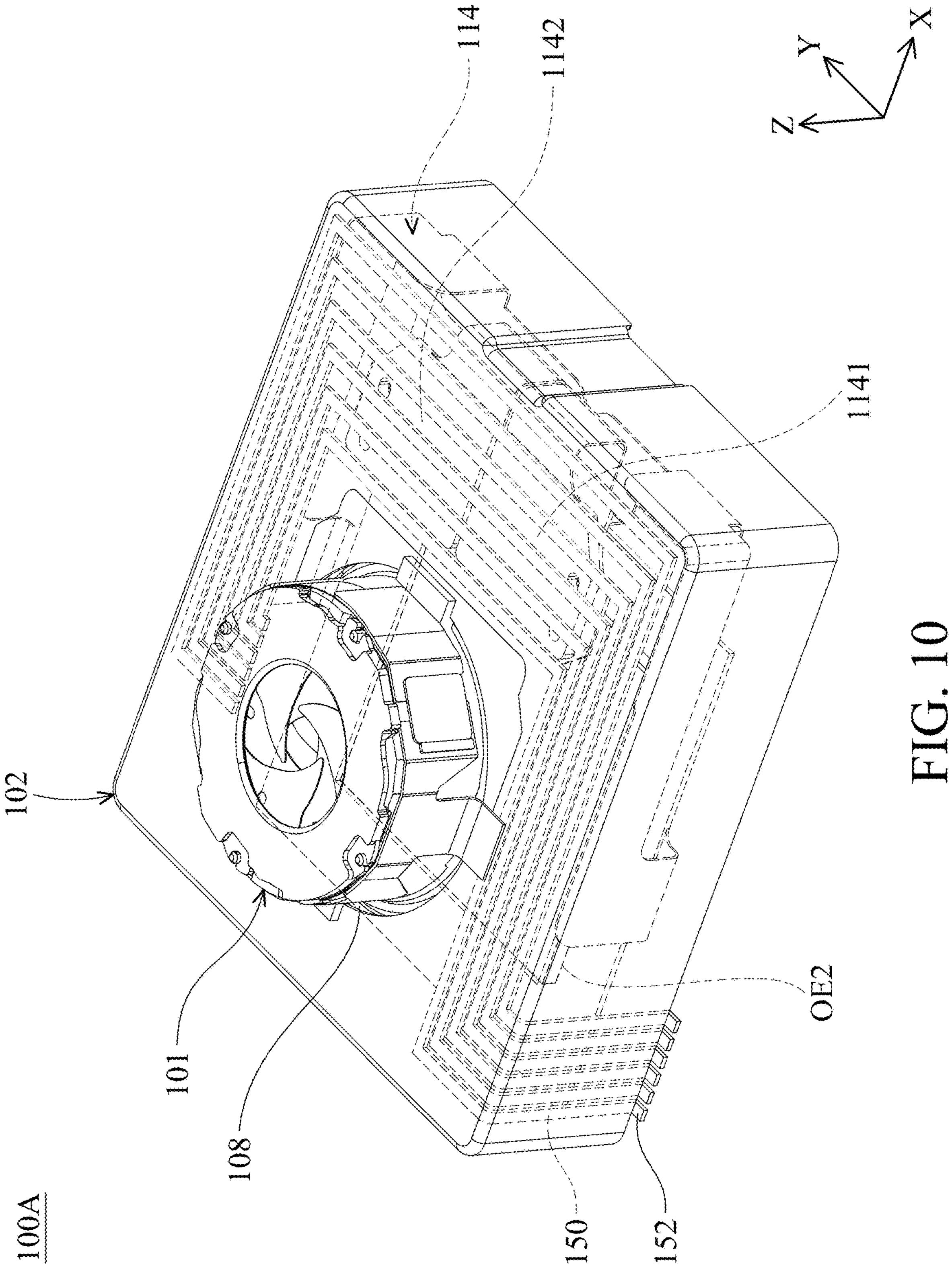
FIG. 10 is a perspective view of an optical element driving mechanism 100A according to another embodiment of the present disclosure.

Next, please refer to FIG. 10, which is a perspective view of an optical element driving mechanism 100A according to another embodiment of the present disclosure. In this embodiment, the first fixed part 108 and the casing 102 are integrally formed as one piece and may be made of a plastic material, for example. Based on such a design, the connection strength between the first fixed part 108 and the casing 102 can be increased so as to hold a heavier first optical element OE1.

Furthermore, in this embodiment, the optical element driving mechanism 100A may include a plurality of circuit members 150 embedded in the casing 102, such as through insert molding technology. The circuit members 150 can be made of a conductive metal material.

In this embodiment, the second optical element OE2 is electrically connected to the circuit members 150 via the cantilevers 1141, 1142 of the second movable part 114, and the circuit members 150 have a plurality of exposed electrical end portions 152 configured to be electrically connected to the aforementioned external circuit. That is, the second optical element OE2 can be directly electrically connected to the external circuit through these circuit members 150.

Because the first circuit assembly 120 of the aforementioned embodiment is omitted, the design based on this embodiment can increase the convenience of assembly of the optical element driving mechanism 100A, and can also increase the overall structural strength, thereby avoiding the problem of some elements detaching when optical element driving mechanism 100A is impacted.

In summary, the present disclosure provides an optical element driving mechanism, which includes a movable assembly, a fixed assembly and two driving assemblies. The fixed assembly has a first fixed part configured to hold a first optical element. The movable assembly is movably connected to the first fixed part and is configured to hold a second optical element, and the driving assemblies are configured to drive the movable assembly to move relative to the fixed assembly. The fixed assembly includes a casing, and the movable assembly is suspended within the casing and surrounds the first fixed part. Based on such a design, compared with the conventional driving mechanism, the design of the present disclosure can hold a larger weight of the first optical element (the camera lens), and more effectively reduce the weight of the movable part and the driving assemblies, thereby achieving the purpose of reducing the weight.

In some embodiments, the top surface of the casing may be formed with an accommodation groove configured to accommodate a first circuit assembly, and the second movable part of the movable assembly may be electrically connected to an external circuit through the first circuit assembly. The first circuit assembly and the second movable part can be flexible circuit boards. In addition, a second circuit assembly can be disposed on the second fixed part of the fixed assembly, and it can also be electrically connected to the external circuit through the first circuit assembly.

When the first circuit assembly is disposed in the accommodation groove, the first circuit assembly does not exceed the top surface of the casing, so that the purpose of miniaturization can be achieved. In addition, the setting position of the accommodation groove also avoids the first end portion of the cantilever of the second movable part. Therefore, when the second movable part moves, the first end portion does not collide with the bottom surface of the casing, thereby preventing the cantilevers of the second movable part from being damaged.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:

a fixed assembly, configured to be connected to a first optical element;

a movable assembly, movable relative to the fixed assembly; and a first driving assembly, configured to drive the movable assembly to move relative to the fixed assembly, wherein the fixed assembly includes a first accommodation space which is configured to accommodate a second optical element, wherein the fixed assembly includes a casing and a base, wherein the casing is configured to be fixedly connected to the base, wherein the casing and the base are arranged along a main axis, wherein the fixed assembly further includes a first fixed part, which is affixed to the casing, wherein the first fixed part is configured to be connected to the first optical element, wherein the movable assembly includes a first movable part which is movably connected to the first fixed part, wherein the casing has a side wall which faces the first movable part, wherein, when viewed along the main axis, the first movable part surrounds the first fixed part, and wherein, when viewed along the main axis, the side wall surrounds the first movable part and the first fixed part.

2. The optical element driving mechanism as claimed in claim 1, wherein:

the first fixed part has a first side surface which faces the first movable part; and the first movable part has a first movable surface which faces the first fixed part.

3. The optical element driving mechanism as claimed in claim 2, wherein;

when viewed along a second axis, the side wall, the first movable surface, the first side surface and the main axis are arranged along a first axis in sequence; and the second axis, the first axis and the main axis are perpendicular to each other.

4. The optical element driving mechanism as claimed in claim 3, wherein:

the fixed assembly further includes a second fixed part which is affixed to the casing;

the second fixed part is disposed on the first fixed part;

the second fixed part and the first fixed part are arranged along the main axis;

the second fixed part has a third optical element;

the second fixed part has a second main body and a plurality of second fixed structures; and the plurality of second fixed structures extends from the second main body along the first axis.

5. The optical element driving mechanism as claimed in claim 4, wherein:

each of the plurality of second fixed structures has an outward protruding portion and a downward pressing portion;

the outward protruding portion is connected between the second main body and the downward pressing portion;

when viewed along the first axis, the outward protruding portion overlaps a top wall of the casing;

when viewed along the first axis, the downward pressing portion does not overlap the top wall;

when viewed along the main axis, the downward pressing portion overlaps the top wall;

when viewed along the main axis, the outward protruding portion does not overlap the top wall; and when viewed along the main axis, the outward protruding portion has an arc-shaped structure.

6. The optical element driving mechanism as claimed in claim 3, wherein:

the first fixed part has a first main body and a first fixed structure;

the first fixed structure is configured to be affixed to the casing;

the first fixed structure has a plurality of contact portions which protrude from the first main body along the main axis;

the plurality of contact portions are configured to be in contact with a bottom surface of a top wall of the casing;

the first fixed structure further has a plurality of engaging portions which are respectively disposed on the plurality of contact portions; and each of the plurality of engaging portions has a hook-shaped structure.

7. The optical element driving mechanism as claimed in claim 6, wherein:

the plurality of engaging portions are configured to be in contact with a top surface of the top wall;

when viewed along the first axis, each of the engaging portions and the corresponding contact portion are located on opposite sides of the top wall;

each of the plurality of contact portions has a left segment and a right segment; and when viewed along the main axis, the engaging portion is located between the corresponding left segment and the corresponding right segment.

8. The optical element driving mechanism as claimed in claim 7, wherein:

the optical element driving mechanism further includes a middle assembly;

the movable assembly is movably connected to the fixed assembly through the middle assembly;

the middle assembly includes a first elastic element configured to connect the first movable part and the first fixed part;

the first elastic element has a first movable section, a first middle section and a first fixed section;

the first middle section is connected between the first movable section and the first fixed section;

the first movable section is fixedly connected to an upper surface of the first movable part; and the first fixed section is fixedly connected to the first fixed part.

9. The optical element driving mechanism as claimed in claim 8, wherein:

the middle assembly includes a second elastic element configured to connect the first movable part and the first fixed part;

the second elastic element has a second movable section, a second middle section and a second fixed section;

the second middle section is connected between the second movable section and the second fixed section;

the second movable section is fixedly connected to a first protruding platform of the first movable part; and the first protruding platform protrudes from a lower surface of the first movable part.

10. The optical element driving mechanism as claimed in claim 9, wherein:

the second fixed section is fixedly connected to a second protruding platform of the first fixed part;

the second protruding platform protrudes from a bottom surface of the first fixed part; and when viewed along the first axis, the first elastic element and the second elastic element are not located between the side wall and the first movable surface.

11. The optical element driving mechanism as claimed in claim 10, wherein:

the movable assembly further includes a second movable part configured to hold the second optical element;

the middle assembly further includes a middle elastic element connected between the first movable section and the second movable part;

the middle elastic element has a strip-shaped structure which extends along the main axis;

the first driving assembly includes a first magnetic element and a second magnetic element;

the first magnetic element is disposed on the first fixed part;

the second magnetic element corresponds to the first magnetic element and is disposed on the first movable part;

the first magnetic element is configured to induce with the second magnetic element to generate a first driving force;

the first driving force is configured to drive the first movable part and the second movable part to move along the main axis relative to the first fixed part; and when the first movable part and the second movable part move along the main axis, the middle elastic element moves along the main axis at the same time, and the middle elastic element does not deform.

12. The optical element driving mechanism as claimed in claim 11, wherein:

the optical element driving mechanism further includes a second driving assembly configured to drive the second movable part to move relative to the first movable part and the first fixed part;

the second driving assembly includes a third magnetic element which is disposed on the second movable part;

the third magnetic element is configured to induce with the second magnetic element to generate a second driving force; and the second driving force is configured to drive the second movable part to move along the first axis and/or the second axis.

13. The optical element driving mechanism as claimed in claim 12, wherein:

the second movable part has a movable main body and at least one cantilever;

the at least one cantilever is connected between the movable main body and the casing;

the at least one cantilever has a first end portion, a plurality of curved portions and a second end portion; and the curved portions are connected between the first end portion and the second end portion.

14. The optical element driving mechanism as claimed in claim 13, wherein:

when viewed along the main axis, the movable main body has a rectangular structure;

when viewed along the main axis, the rectangular structure has a side;

when viewed along the main axis, the first end portion extends from a center of the side of the rectangular structure;

the second end portion is disposed in a communication opening of the casing; and the communication opening is formed by the top surface of the casing.

15. The optical element driving mechanism as claimed in claim 14, wherein:

the optical element driving mechanism further includes a first circuit assembly which is disposed in an accommodation groove of the casing;

the accommodation groove is connected to the communication opening;

the fixed assembly further includes a second fixed part, which is affixed to the casing;

the second fixed part is disposed on the first fixed part; and a second circuit assembly is disposed on the second fixed part, and the second circuit assembly and the second end portion of the second movable part are electrically connected to an external circuit through the first circuit assembly.

16. The optical element driving mechanism as claimed in claim 15, wherein:

the accommodation groove has a first accommodation portion and a second accommodation portion;

the first accommodation portion is recessed from the top surface of the top wall;

the second accommodation portion is recessed from an outside surface of the side wall;

the first circuit assembly has a first section and a second section;

the second section is connected to the first section; and the first section and the second section are respectively accommodated in the first accommodation portion and the second accommodation portion.

17. The optical element driving mechanism as claimed in claim 16, wherein:

when viewed along the main axis, the first section has a U-shaped structure surrounding a portion of the second fixed part;

the second end portion of the at least one cantilever is fixedly connected to the first section; and when viewed along the main axis, the second section has an L-shaped structure.

18. The optical element driving mechanism as claimed in claim 17, wherein:

when viewed along the main axis, the accommodation groove does not overlap the first end portion;

when viewed along the first axis, the first end portion is located between the side wall and the accommodation groove;

when viewed along the second axis, the first end portion does not overlap the accommodation groove;

the second circuit assembly has a first electrical connection terminal and a second electrical connection terminal; and when viewed along the first axis, the first electrical connection terminal and the second electrical connection terminal are located on opposite sides of the second fixed part.

19. The optical element driving mechanism as claimed in claim 18, wherein:

the first electrical connection terminal and the second electrical connection terminal are respectively provided with a plurality of first electrical contacts and a plurality of second electrical contacts, which are connected to the first circuit assembly;

when viewed along the first axis, the first section is located in the accommodation groove, and the top surface does not overlap the first section of the first circuit assembly along the second axis;

when viewed along the first axis, in the main axis, the first section is closer to a light incident end of the optical element driving mechanism than the second optical element;

a plurality of electrical contacts is formed on the second section and is configured to be electrically connected to the external circuit; and when viewed along the first axis, in the main axis, the electrical contacts are closer to a light exit end of the optical element driving mechanism than the first section.

20. The optical element driving mechanism as claimed in claim 3, wherein:

the first fixed part and the casing are integrally formed as one piece;

the optical element driving mechanism further includes a plurality of circuit members embedded in the casing;

the movable assembly further includes a second movable part configured to hold the second optical element;

the second optical element is electrically connected to the circuit members through at least one cantilever of the second movable part; and the circuit members have a plurality of electrical end portions configured to be electrically connected to an external circuit.

* * * * *